July 3, 1962
J. COBB ET AL
3,042,595
NEUTRONIC REACTOR
Filed April 15, 1957
3 Sheets-Sheet 1
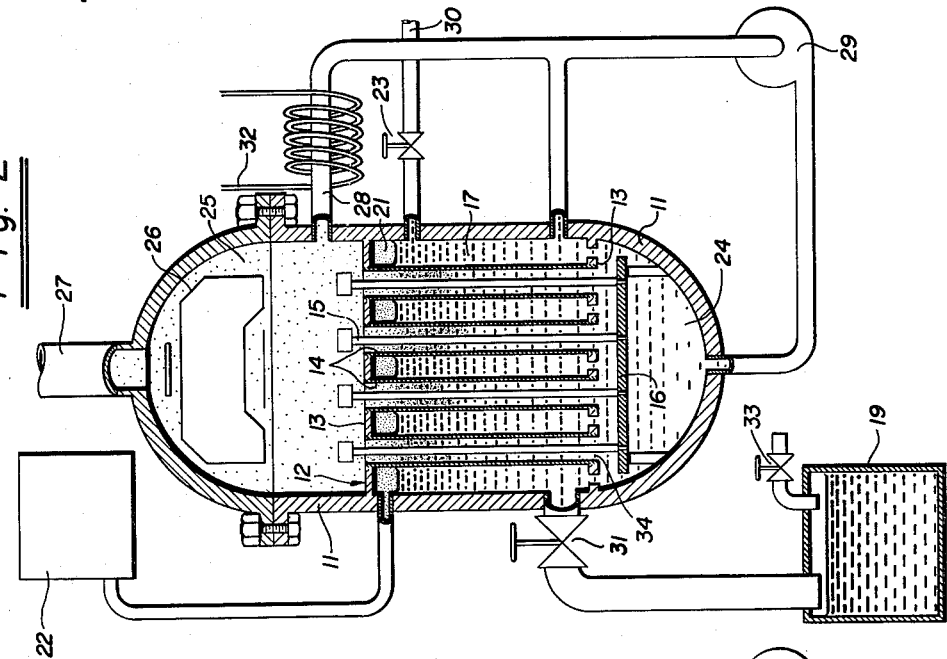
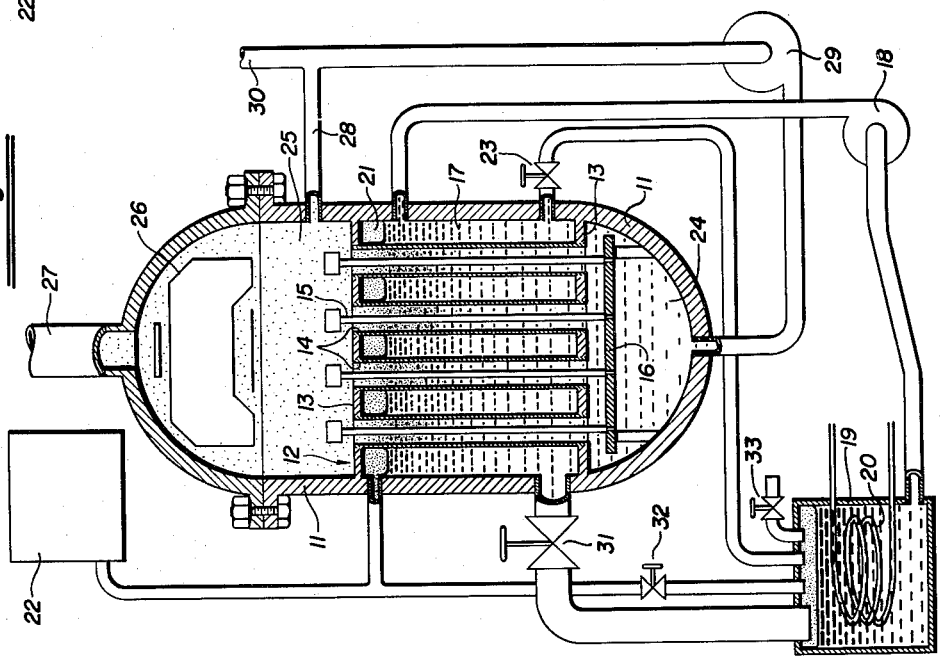
INVENTORS. John Cobb
Charles M. Rice
Wayne L. Ross
Kenneth W. Sauer
BY
*Attorney*

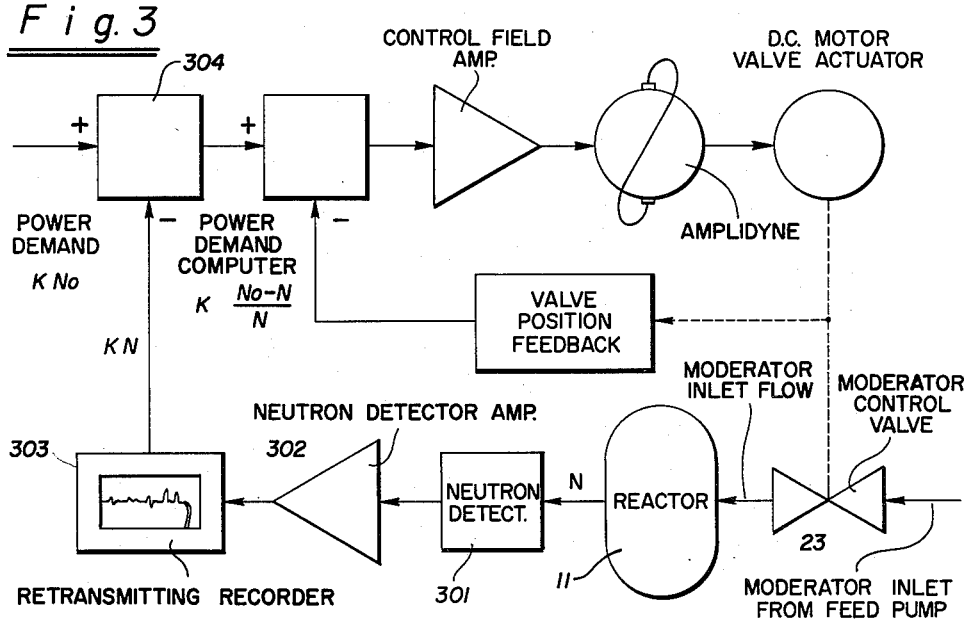
Fig. 3
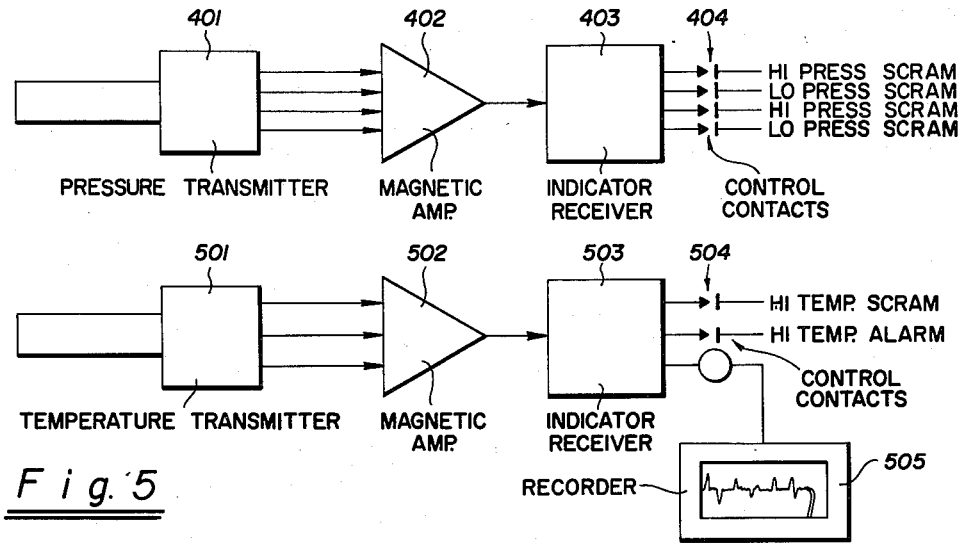
Fig. 4
Fig. 5

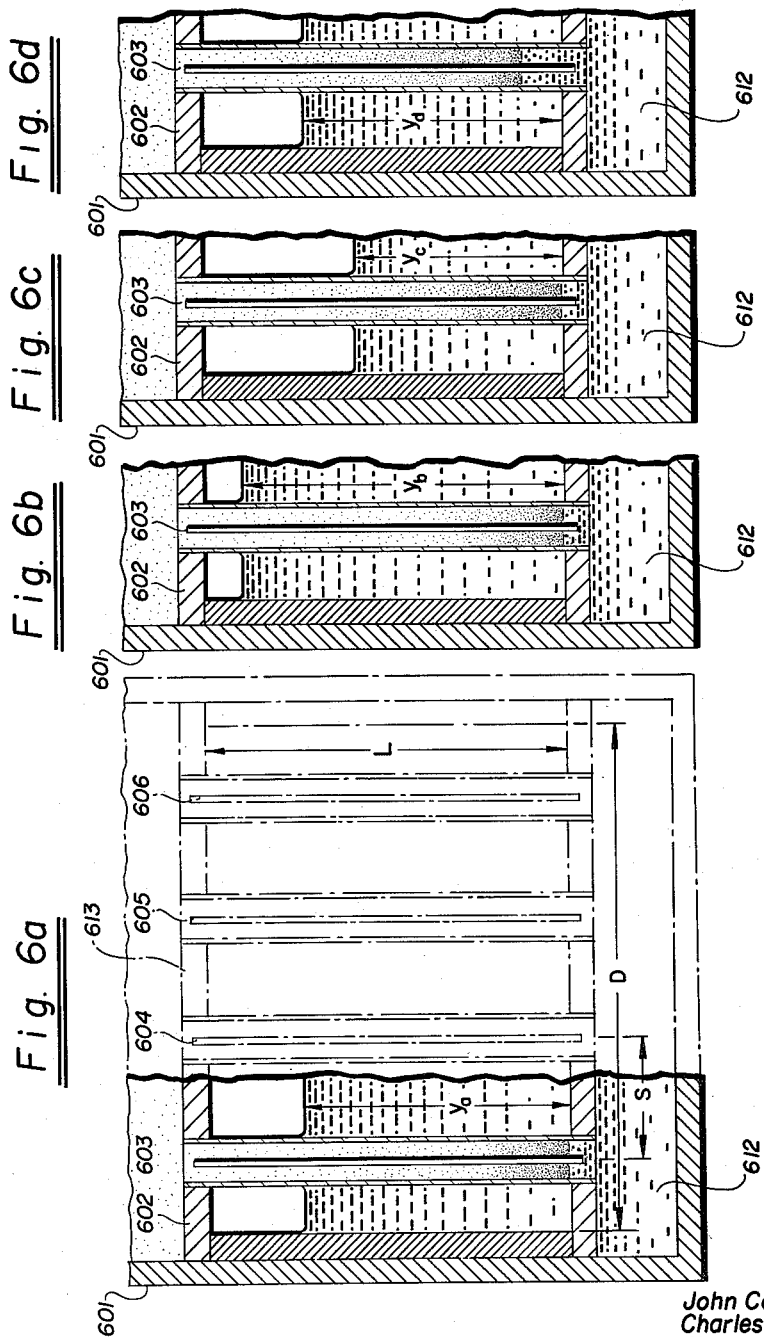

United States Patent Office 3,042,595
Patented July 3, 1962

3,042,595
NEUTRONIC REACTOR
John Cobb, Mountain View, Charles M. Rice, Palo Alto, Wayne L. Ross, Mountain View, and Kenneth W. Sauer, Palo Alto, Calif., assignors to American Radiator and Standard Sanitary Corporation, a corporation of Delaware
Filed Apr. 15, 1957, Ser. No. 652,900
2 Claims. (Cl. 204—154.2)

This invention relates to neutronic reactors in general and more particularly to means and methods of controlling a nuclear fission chain reaction.

It is known that neutron fissionable isotopes, such as $U^{233}$, $U^{235}$, or $Pu^{239}$, or mixtures and compounds thereof, may be arranged and disposed geometrically within certain media so that the extra neutrons produced during fission are utilized in further fission and a self-sustaining chain reaction thus produced. The aforementioned media utilized in slowing down the neutrons produced in fission are known as "moderators." The requirements which must be met to make such a neutronic reactor operable are set forth in U.S. Patent No. 2,708,656 of Enrico Fermi and Leo Szilard, issued May 17, 1955. Methods of controlling the chain reaction which takes place in a neutronic reactor is likewise discussed in the aforementioned patent of Fermi and Szilard.

The proper function of the moderator in a neutronic reactor is of utmost importance. It is the principal object of this invention to provide a novel arrangement and use of the moderator in order to improve the operation of neutronic reactors of certain types as hereinafter more fully set forth.

The neutrons released as the result of nuclear fission are generally of high kinetic energy and are referred to as "fast" neutrons. In order that neutrons may enter the nuclei of other atoms and induce fission in the fissionable ones, they must be slowed down or moderated. This process is more fully described in U.S. Patent No. 2,206,634, to Fermi et al., issued July 2, 1940. It consists essentially of elastic or "billiard-ball" types of collisions with the nuclei of the moderator material. For this reason, the best moderators are materials of low atomic weight. In addition to their scattering properties, good moderators must not absorb neutrons in their own nuclei to any great extent or, in other words, must have a low absorption cross-section. Typical materials which have been shown to be good moderators are carbon, beryllium, beryllium oxide, light water, and heavy water, the last named being by far the most advantageous.

The effectiveness of a moderator is dependent upon its density and hence its temperature. For this reason, a gas is not a good moderator, and a mixture of a solid and gas or vapor will generally have its scattering effect decreased in proportion to the volume of vapor present. On the other hand, since the moderator has the property of absorbing neutrons, this effect is likewise reduced in proportion to the amount of vapor present. The combined effect of these two factors will become apparent on further study of this invention.

It is known that it is possible to operate a neutronic reactor in which a liquid performs the dual purpose of coolant and moderator and in which said liquid is maintained in a boiling condition.

All of the existing so-called boiling reactors have at least one common fault. The change in state from liquid to vapor produces a change in moderating value of the liquid and hence a change in reactivity. The effect is usually the opposite of what is desired for stable operation. For example, an increase in the demand for steam from the reactor will produce an increase in the relative volume of vapor. Thist produces a decrease in density of the moderator which generally produces a decrease in moderating effect. This, in turn, decreases the reactivity and hence the number of fissions and heat release at a time when there is actually a demand for greater heat release to produce the greater amount of heat required. The result is to nullify many of the advantages of boiling reactors.

The control method most commonly employed consists of introducing neutron absorbers, such as cadmium or boron, in some suitable form, usually as rods, into the reactor in greater or lesser amount, thus regulating the number of neutrons available for continuing the chain reaction at a predetermined level. This method has many disadvantages in the case of existing boiling reactors.

Control rod mechanisms are known to be cumbersome, complicated and expensive. Many provisions must be built into them to make them reliable. They are not inherently safe by nature and hence special precautions must be taken when they are used. Their inherent nature as neutron absorbers is such that they act to distort the flux in the reactor producing irregularities which cause hot spots and other undesirable effects. These effects are much worse in the case of boiling reactors than in other types.

It is one of the specific objects of this invention to eliminate these undesirable conditions of instability and difficulty of control inherent in boiling reactors of the types now in use.

Another object of this invention is to provide a more simple, effective, and safer method of controlling a boiling neutronic reactor than any now in use.

A still further object of this invention is to provide a neutronic reactor capable of longer sustained operation without refueling.

More specifically it is one of the objects of this invention to provide a boiling reactor wherein a new, cheaper and inherently safe method of control is effected by a combination of: (1) a particular core design to obtain a unique relation between voids and reactivity for small load changes; (2) variations in the level of the moderator for intermediate load changes; and (3) variation of the recirculation rate to change the fraction of voids for major load changes.

Other objects and advantages of this invention will become apparent from the description which follows and from reference to the accompanying drawings, wherein:

FIG. 1 is a diagrammatic view of a preferred embodiment of the invention, including a partial flow diagram.

FIG. 2 is an alternate embodiment of the same invention.

FIG. 3 is a diagram of the moderator volume regulating circuit showing a preferred arrangement for controlling the moderator volume.

FIG. 4 is a diagram of the pressure scram circuit.

FIG. 5 is a diagram of the temperature scram circuit.

FIG. 6 is a diagram illustrating the principles of control employed in this invention.

Referring now to FIG. 1, which shows a diagrammatic view and flow diagram, 11 is the main reactor tank or vessel which we prefer to fabricate from stainless steel or other corrosion resistant material in which is securely positioned an internal vessel 12, which may be fabricated from zirconium, aluminum, stainless steel or other material having low neutron capture properties and being corrosion resistant and comprising tube sheets 13, and numerous fuel tubes 14, four of which are shown in the figure by way of illustration. Centrally positioned in each tube 14, are the fuel elements 15, containing the fissionable materials, which are clad in jackets of aluminum, zirconium, stainless steel or other material which has low neutron capture properties and is corrosion resistant. The fuel elements 15, are supported by a lower support or grid plate 16.

In the embodiment shown in FIG. 1, the moderator 17, is circulated by pump 18, from reservoir 19, containing cooling coil 20. The space 21, above the level of the moderator 17, consists of helium under pressure supplied by pressure tank 22, which serves also to maintain reservoir 19, under pressure during normal operation. The flow of moderator 17, and consequently its volume in tank 11, is regulated by valve 23, as hereinafter described in greater detail.

Liquid coolant 24, is circulated through tank 11, the tubes 14, and past the fuel elements 15, where the heat of the fission process converts some of the liquid to vapor 25. The vapor 25, passes through the separator 26, where entrained liquid is removed, the vapor passing out of the tank 11, through the outlet connection 27. The remaining liquid coolant then circulates through line 28, and pump 29, back to tank 11.

Make-up coolant to replace that removed as vapor through outlet 27, is supplied to the system through line 30.

Rapid shut-down or "scramming" of the reactor may be effected by dumping the moderator 17, into the reservoir 19, by simultaneous opening of dump valve 31, closing of helium valve 32, and opening of relief valve 33. The valves 31, 32, and 33 we prefer to make solenoid operated but any other type of quick acting automatic valves would be suitable.

In the embodiment shown in FIG. 2, the same stream of fluid serves as moderator 17, and coolant 24, the flow from the former area to the latter being through openings 34, in lower tube sheet 13. In this embodiment only one pump 29, is employed, and cooling coil 32, is located on line 28.

Flow of moderator (and hence coolant) is regulated by valve 23, located in make-up line 30, the operation of which is hereinafter more fully described.

Should an unusual combination of circumstance produce over heating and hence boiling of the moderator, this would act to reduce reactivity and tend to shut the reactor down thus avoiding a dangerous power excursion which might have occurred if control rods had been used and had failed to operate.

The operation of the system is essentially the same in either the embodiment shown in FIG. 1 or FIG. 2. All boiling is normally accomplished in the tubes 14, and none in the space occupied by moderator 17. The relative proportions of coolant in the tubes and of moderator external to same may be so adjusted with relation to the amount of fissionable material in the tubes that the net result of increased boiling in the tubes is to increase reactivity as will be hereinafter more fully demonstrated. This reactor characteristic is defined herein as a positive void coefficient of reactivity and will be referred to hereinafter as such.

Control of reactivity is further effected by variation in moderator volume 17, by means of valve 23. This is necessary to take care of substantial changes in demand for heat from the reactor, to compensate for burn-up of fissionable material, or to bring the reactor up to criticality upon starting.

Referring now to FIG. 3, which is a diagram of a preferred control circuit, the reactor is shown at 11, and the moderator control valve at 23, which was previously described as regulating the flow and hence volume of moderator in the reactor. A neutron detector 301, which may be any type of ionization chamber or other device sensitive to neutron flux positioned in the reactor 11, picks up a signal which may be designated as $n$. This is amplified in neutron detector amplifier 302, and fed through retransmitting recorder 303. At this point the signal may be designated as a function of $n$ or $kn$, and as such is fed into the power demand computer 304. Also fed into the computer 304 are signals from the reactor 11, which indicate the neutron demand which may be based on temperature, pressure, or flow, or a combination of all three taken at the reactor outlet 27, and may be designated as $kn_0$. The power demand computer receives these signals and in turn sends out a signal which is based on the difference between the existing neutron flux $n$ and the required flux $n_0$ referred to the general flux level $n_0$, or $$k \cdot \frac{(n_0 - n)}{n_0}$$

The remainder of the circuit shown comprises a typical servo-mechanism utilizing an amplidyne and direct current motor to drive the control valve 23, but any other suitable mechanism including a pneumatic or hydraulic system may be employed.

Referring now to FIG. 4, which is a preferred safety or scram circuit, 401 is a pressure transmitter or transducer positioned at any desired point in the reactor where it picks up pressure signals, converts them to electrical signals, and transmits them to the magnetic amplifier 402. These signals are indicated on an indicator receiver 403, and in turn operate the control contacts 404. The control contacts 404, operate valves 31, 32, and 33 as hereinbefore described.

Referring now to FIG. 5 which is a preferred safety or scram circuit operated by reactor temperature, 501 is a temperature transmitter of a resistance, potentiometer, or other suitable type. This is positioned at any desired point in the reactor where it picks up temperature signals, converts them to electrical signals, and transmits them to the magnetic amplifier 502. These signals are indicated on an indicator receiver 503, recorded on a recorder 505, and simultaneously operate control contacts 504, which operate a high temperature alarm and the valves 31, 32, and 33 as described above.

It is known that boiling in a reactor in which moderator and coolant are not separated produces an undesirable effect upon increased demand for steam in that the net effect of total boiling is to produce less moderation, and hence neutron density, at a time when the opposite effect is desired as hereinbefore set forth. When the boiling is confined to tubes, however, as disclosed in our invention, it is possible to so construct the reactor with respect to ratio between moderator and coolant that the opposite or desired effect is produced. This results partly from the fact, as is evident from FIG. 1 and FIG. 2, that the volume of coolant in the tubes 14 is small in proportion to the volume of the moderator 17. The decreased moderating effect of the coolant is more than compensated for by the decreased neutron absorption in the coolant brought about by the great change in density which occurs as the coolant changes from a liquid to a vapor. The net result of this would be to produce better operation were it not for the fact that the reactor is difficult to control by means of conventional control rods. The effect of flux distortion and consequent hot spots hereinbefore described is far more serious in the case of boiling reactors than in other types, since the heat transfer conditions are less favorable and over-heating and burn-out of fuel elements is more likely to occur. Where the boiling is performed in separate tubes, this condition is even worse since the volume of coolant readily available for cooling purposes is considerably less. For these reasons, all previous reactors utilizing separate cooling tubes have been so constructed as to prevent all boiling in the tubes.

We have discovered that by elimination of control rods and effecting the desired control by variation of moderator volume and hence reactivity, the undesirable flux distortions are avoided, smoother operation is obtained, and boiling in the tubes without boiling in the moderator is made practicable.

In order to illustrate an operative system and to demonstrate quantitatively the operation of our reactor core, we have selected as a specific example, a light water cooled and moderated reactor having a normal heat output of 60 megawatts. It is understood, however, that other arrangements, materials, sizes, quantities, and geometric configurations are possible, and we do not in any way intend to limit ourselves to the example which is shown herein.

In the specific example selected, the reactor is fueled with uranium enriched in the isotope 235 in the amount of 2 percent and contains 8 tons of the said uranium in its core.

Referring now to FIG. 6 which is a diagram illustrating the principle of control utilized in our invention as it applies to the example above, 601 represents the reactor tank and 603, 604, 605 and 606 represent four typical fuel tubes under normal operation at rated load.

The light water coolant 612 is under a pressure of 600 pounds per square inch and produces steam 613 at 486 degrees Fahrenheit.

The core diameter D is 68 inches, the diameter of the zirconium fuel tubes is 6.75 inches, the active length of the fuel element L is 72 inches and the spacing S of elements or lattices is 7 inches. The height or level of moderator in the reactor will vary and at any instant will be equal to a height y, which will provide the volume of moderator necessary to maintain criticality of the reactor under the given conditions. Before establishing this value it is necessary to establish the manner in which variable amounts of heat are removed from a boiling reactor.

The fluid which flows through the tubes 603, 604, 605 and 606 and leaves the tube sheet 602 is composed of a mixture of steam and water. The amount of heat being removed from the reactor at any instant is proportional to the amount of steam being produced. This in turn is proportional to the total flow of fluid through the tubes and to the ratio of steam to water which exists at the tube sheet 602, which is referred to as "exit quality."

This heat removal in turn may be varied in a reactor such as we have described here by one of three methods which will depend upon the amount of incremental heat which it is desired to remove at any instant as described below.

(a) Where the Incremental Heat Removal Is Relatively Small

For an increase in load or steam demand of the order of magnitude of 25 percent we have found that there is a slight decrease in pressure which is accompanied by an increase in steam voids and a decrease in density of the coolant. While this produces a decrease in moderating effect, it also produces a decrease in neutron absorption because of the lesser volume of water present. For a configuration such as that shown we have found that since most of the moderating is done in the non-boiling moderator the effect of boiling in the tube on over-all moderation is very small compared to the decrease in neutron absorption. The net result, therefore, of an increase in the load or steam demand is to increase reactivity which in turn results in greater heat output raising the steam pressure, flow, and density, thus stabilizing the reactor at the higher output rate or power level, which is what is desired. Under these conditions operation proceeds under a positive void coefficient. For a decrease in load the reverse of the above process takes place.

(b) Where the Incremental Heat Removal Is of Intermediate Size

For increases in load or steam demand of the order of magnitude of 50 percent it is desirable to resort to external means of increasing reactivity and thus stabilizing the reactor at a higher power level, since it is difficult to build a reactor in which the automatic self-controlling characteristics described under (a) above to take care of load changes of the order of magnitude stated above. Thus a point is reached where the reverse effect of that described under (a) above is produced, namely increased boiling and decreased density produces a decrease in reactivity. This characteristic of increased boiling resulting in a decrease in reactivity will be referred to hereinafter as "negative void coefficient of reactivity." When this occurs the increased reactivity required is produced by increasing the moderator volume as hereinbefore described. The ratio of steam to water is increased by the greater rate of boiling and the reactor is stabilized at the higher power level and larger moderator volume. Here operation continues to proceed under a positive void coefficient.

(c) Where the Incremental Heat Removal Is Relatively Large

The process described under (b) above may be continued until a point is reached where the density of the fluid in the tubes is such that the increase in moderator volume required to retain reactivity may be so great as to be impracticable. This may occur where increased power requirements are of the order of magnitude of 90 percent. When this occurs the increased heat removal required may be obtained by increasing the flow of fluid through the tubes, the percentage of steam to water being maintained constant at the predetermined practicable maximum. The control required for changes in reactivity resulting from this increased flow is provided by changes in moderator volume as hereinbefore described.

In the operation of a reactor such as we show here, over-all control may be effected by utilizing all three of the foregoing methods depending on power requirements at any given instant in the manner which we have described.

Referring again to FIG. 6 and considering the illustrative case specified above, we find that the required amount of heat may be removed from the reactor at the rated load of 60 heat megawatts when the exit quality or percent steam by weight leaving the tube sheet 602 is 20 percent. This may be accomplished with an effective heat transfer area of 1400 square feet in the reactor at a heat flux of 146,000 British thermal units per hour per square foot. Using established methods of calculating the heat transfer in the tube we find that for an exit quality of 20 percent the average specific gravity of fluid in the tube is .4, which is a figure that has been verified by experiment.

Taking this value of specific gravity and the other conditions specified above, the height of the moderator y as shown on FIG. 6 may be calculated as follows:

We start with the basic relationship which it is known must exist to maintain a chain reaction, namely $$k\infty = \eta \epsilon f p$$

in which $k$=multiplication constant for an infinite reactor
$\eta$=neutrons liberated per fuel capture
$\epsilon$=fast fission factor
$f$=thermal utilization factor
$p$=resonance escape probability From this we compute $$k_{\text{eff}} = \frac{k\infty}{(1+L^2B^2)(1+B^2\tau)}$$

in which $k_{\text{eff}}$=multiplication constant for a finite reactor
$L$=thermal diffusion length
$\tau$=slowing down length
$B^2$=buckling Knowing the foregoing we are able to compute the value of y in FIG. 6 by the formula $$B^2 = \frac{2.405}{R} + \left(\frac{\pi}{y}\right)^2$$

in which $R$=the reactor radius including the reflector saving.

For the 60 megawatt condition described above we obtain a value of $y_a$ in FIG. 6a of 50 inches.

Relatively small changes in power from the level of 60 heat megawatts will be taken care of in the manner described under (a) above and the resultant change in $y$ on FIG. 6 will not be perceptible.

If now the power requirements are increased from 60 to 90 megawatts using the method of calculation described above the required moderator volume could be provided by raising the height $y$ to 52 inches which is represented as $y_b$ in FIG. 6b.

By the same method, a power of 30 megawatts could be provided with the moderator height at 48 inches represented by $y_c$ in FIG. 6c.

If the power requirements are raised to 110 megawatts the situation described under (c) might be realized. The flow could be increased by increasing pumping rate through the reactor, the moderator height dropping to $y_d$ in FIG. 6d which will be very close to that of $y_a$ in FIG. 6a.

It is obvious from the foregoing example that operation of the reactor disclosed herein is inherently stable insofar as sudden changes in power demand are concerned and that other changes in output may be taken care of by variation in moderator volume and/or pumping rate. It is further obvious that the foregoing control may be effected without the use of any conventional control rods whatsoever.

After prolonged operation of the reactor when reactivity is decreased by depletion of fissionable material and presence of fission products, the reactivity may be restored by raising the normal level of the moderator 607, represented by a new value of $y_a$ in FIG. 6. This has the effect of introducing more fresh fissionable material into the core and effecting further operational control.

While we have shown specific embodiments and examples of our invention herein, we do not intend to so limit ourselves since many variations will be apparent to those skilled in the art without departing from the intended scope of the invention as disclosed herein which is limited only by the claims which follow.

We claim:

1. The method of operating a boiling neutronic reactor having a core, a light water coolant, a separate water moderator and fissionable material disposed in said light water coolant, the reactor being one which has the operating characteristic of functioning with positive and negative void coefficient of reactivity comprising: maintaining a relationship between the relative proportions of coolant and moderator to each other and to the amount of fissionable material to maintain for relatively small incremental heat removal a positive void coefficient of reactivity, under which the reactor is automatically load following responsive to vapor pressure developed, varying the moderator level to increase the range of control of reactivity to supply relatively large load demands while maintaining positive void coefficient of reactivity.

2. The method of operating a boiling neutronic reactor having a core, a light water coolant, a separate water moderator and fissionable material disposed in said light water coolant, the reactor being one which has the operating characteristic of functioning with positive and negative void coefficient of reactivity comprising: maintaining a relationship between the relative proportions of coolant and moderator to each other and to the amount of fissionable material to maintain for relatively small incremental heat removal a positive void coefficient of reactivity, under which the reactor is automatically load following responsive to vapor pressure developed, varying the moderator level to increase the range of control of reactivity, to supply intermediate size incremental heat removal demands while maintaining positive void coefficient of reactivity, and varying the recirculation rate of said light water coolant for large load demands to increase the control range of reactivity where moderator level control and vapor pressure control are ineffective to provide the necessary reactivity to carry such load.

References Cited in the file of this patent

UNITED STATES PATENTS

| | | |
|---|---|---|
| 2,736,696 | Wigner et al. | Feb. 28, 1956 |
| 2,770,591 | Wigner et al. | Nov. 13, 1956 |
| 2,810,689 | Wigner et al. | Oct. 22, 1957 |

FOREIGN PATENTS

| | | |
|---|---|---|
| 753,130 | Great Britain | July 18, 1956 |

OTHER REFERENCES

Untermyer: "Nucleonics," vol. 12, No. 7, pp. 43–47, July 1954.

"Nucleonics," vol. 14, No. 7, July 1956, pp. 42–45.

Dietrich: "International Conference on the Peaceful Uses of Atomic Energy," vol. 13, pp. 88–101, August 1955, U.N. Publication, New York.